United States Patent
Caron

(10) Patent No.: US 8,079,038 B2
(45) Date of Patent: Dec. 13, 2011

(54) METHOD AND APPARATUS FOR CREATING, SENDING, AND USING SELF-DESCRIPTIVE OBJECTS AS MESSAGES OVER A MESSAGE QUEUING NETWORK

(75) Inventor: Ilan Gabriel Caron, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 938 days.

(21) Appl. No.: 12/051,724

(22) Filed: Mar. 19, 2008

(65) Prior Publication Data

US 2008/0163250 A1 Jul. 3, 2008

Related U.S. Application Data

(63) Continuation of application No. 10/991,723, filed on Nov. 18, 2004, now Pat. No. 7,631,317, which is a continuation of application No. 09/114,231, filed on Jun. 30, 1998, now Pat. No. 6,848,108.

(51) Int. Cl.
*G06F 13/00* (2006.01)
(52) U.S. Cl. .................. 719/313; 719/314; 709/238
(58) Field of Classification Search .............. 719/313, 719/314; 709/238
See application file for complete search history.

(56) References Cited

U.S. PATENT DOCUMENTS

| | | |
|---|---|---|
| 4,499,576 A | 2/1985 | Fraser |
| 4,584,679 A | 4/1986 | Livingston et al. |
| 4,623,886 A | 11/1986 | Livingston |
| 4,656,474 A | 4/1987 | Mollier et al. |
| 4,736,369 A | 4/1988 | Barzilai et al. |
| 4,769,815 A | 9/1988 | Hinch et al. |
| 5,063,562 A | 11/1991 | Barzilai et al. |
| 5,163,131 A | 11/1992 | Row et al. |
| 5,193,090 A | 3/1993 | Filipiak et al. |
| 5,247,676 A | 9/1993 | Ozur et al. |
| 5,257,369 A | 10/1993 | Skeen et al. |
| 5,285,445 A | 2/1994 | Lehnert et al. |
| 5,287,103 A | 2/1994 | Kasprzyk et al. |
| 5,317,736 A | 5/1994 | Bowen |
| 5,327,559 A | 7/1994 | Priven et al. |
| 5,361,351 A | 11/1994 | Lenkov et al. |
| 5,367,523 A | 11/1994 | Chang et al. |
| 5,422,999 A | 6/1995 | Travis et al. |
| 5,465,328 A | 11/1995 | Dievendorff et al. |
| 5,526,358 A | 6/1996 | Gregerson et al. |
| 5,526,489 A | 6/1996 | Nilakantan et al. |

(Continued)

OTHER PUBLICATIONS

Benaloh, Josh et al., The Private Communication Technology (PCT) Protocol, Internet Draft, Available from Oct. 1995.

(Continued)

*Primary Examiner* — Andy Ho
(74) *Attorney, Agent, or Firm* — Merchant & Gould, P.C.

(57) ABSTRACT

An invention for creating, sending, and using self-descriptive objects as messages over a network is disclosed. In an embodiment of the present invention, self-descriptive persistent dictionary objects are serialized and sent as messages across a message queuing network. The receiving messaging system unserializes the message object, and passes the object to the destination application. The application then queries or enumerates message elements from the instantiated persistent dictionary, and performs the programmed response. Using these self-descriptive objects as messages, the sending and receiving applications no longer rely on an a priori convention or a special-coding serialization scheme. Rather, messaging applications can communicate arbitrary objects in a standard way with no prior agreement as to the nature and semantics of message contents.

20 Claims, 8 Drawing Sheets

U.S. PATENT DOCUMENTS

| | | | |
|---|---|---|---|
| 5,546,391 | A | 8/1996 | Hochschild et al. |
| 5,555,415 | A | 9/1996 | Allen |
| 5,557,748 | A | 9/1996 | Norris |
| 5,572,522 | A | 11/1996 | Calamvokis et al. |
| 5,572,582 | A | 11/1996 | Riddle |
| 5,627,766 | A | 5/1997 | Beaven |
| 5,754,849 | A | 5/1998 | Dyer et al. |
| 5,758,184 | A | 5/1998 | Lucovsky et al. |
| 5,761,507 | A | 6/1998 | Govett |
| 5,764,625 | A | 6/1998 | Bournas |
| 5,768,532 | A | 6/1998 | Megerian |
| 5,777,987 | A | 7/1998 | Adams et al. |
| 5,778,384 | A | 7/1998 | Provino et al. |
| 5,793,861 | A | 8/1998 | Haigh |
| 5,793,965 | A | 8/1998 | Vanderbilt et al. |
| 5,805,823 | A * | 9/1998 | Seitz .............................. 709/236 |
| 5,812,819 | A | 9/1998 | Rodwin et al. |
| 5,815,667 | A | 9/1998 | Chien et al. |
| 5,819,042 | A | 10/1998 | Hansen |
| 5,828,653 | A | 10/1998 | Goss |
| 5,832,219 | A | 11/1998 | Pettus |
| 5,835,727 | A | 11/1998 | Wong et al. |
| 5,838,907 | A | 11/1998 | Hansen |
| 5,845,081 | A | 12/1998 | Rangarajan et al. |
| 5,854,901 | A | 12/1998 | Cole et al. |
| 5,864,669 | A | 1/1999 | Osterman et al. |
| 5,872,968 | A | 2/1999 | Knox et al. |
| 5,875,301 | A | 2/1999 | Duckwall et al. |
| 5,875,306 | A | 2/1999 | Bereiter |
| 5,878,056 | A | 3/1999 | Black et al. |
| 5,881,051 | A | 3/1999 | Arrowood et al. |
| 5,901,138 | A | 5/1999 | Bader et al. |
| 5,916,307 | A | 6/1999 | Piskiel et al. |
| 5,920,697 | A | 7/1999 | Masters et al. |
| 5,922,049 | A | 7/1999 | Radia et al. |
| 5,922,054 | A | 7/1999 | Bibayan |
| 5,930,479 | A | 7/1999 | Hall |
| 5,956,340 | A | 9/1999 | Afek et al. |
| 6,035,303 | A | 3/2000 | Baer et al. |
| 6,052,711 | A | 4/2000 | Gish |
| 6,064,816 | A | 5/2000 | Parthasarathy et al. |
| 6,101,556 | A | 8/2000 | Piskiel et al. |
| 6,128,621 | A | 10/2000 | Weisz |
| 6,202,089 | B1 | 3/2001 | Juster |
| 6,205,498 | B1 | 3/2001 | Habusha et al. |
| 6,209,040 | B1 | 3/2001 | Acton et al. |
| 6,226,666 | B1 | 5/2001 | Chang et al. |
| 6,256,634 | B1 | 7/2001 | Moshaiov et al. |
| 6,272,521 | B1 | 8/2001 | Jablonski et al. |
| 6,275,912 | B1 | 8/2001 | Haba |
| 6,446,144 | B1 | 9/2002 | Habusha et al. |
| 6,446,206 | B1 | 9/2002 | Feldbaum |
| 6,529,932 | B1 | 3/2003 | Dadiomov et al. |
| 6,564,377 | B1 | 5/2003 | Jayasimha et al. |
| 6,678,726 | B1 | 1/2004 | Moshaiov |

OTHER PUBLICATIONS

Biggs, Maggie, "Applications Released from Platform Confines: Message Queuing Exchanges Data between Apps Regardless of Platform", Infoworld, Feb. 23, 1998.

Bowen, Ted Smalley, "Asynchronous Messaging Pushes to the Fore", Infoworld, Feb. 23, 1998.

Brockschmidt, K., Inside OLE, $2^{nd}$ Ed. Microsoft Press, 1995, Chapter 3.

Comer, Douglas E., Internetworking with TCP/IP vol. 1: Principles, Protocols and Architecture, Chapter 6: Determining and Internet Address at Startup (RARP) and Chapter 18: Client-Server Model of Interaction, pp. 83-88, 293-309, Prentice-Hall, Englewood Cliffs, New Jersey, 1991.

Comer, Douglas E., Internetworking with TCP/IP, vol. 1: Principles, Protocols and Architecture, Second Edition, Chapter 19, 1991.

Final Office Action for U.S. Appl. No. 09/114,231 dated Jul. 7, 2003.

Final Office Action for U.S. Appl. No. 10/991,723 dated Jan. 22, 2009.

Final Office Action for U.S. Appl. No. 10/991,723 dated Mar. 13, 2008.

Jaworski, Jamie "JAVA 1.1 Developer's Guide," Second Edition, Sams.net Publishing, 1997; pp. 90-101, 218-226, 934-941.

Jaworski, Jamie "JAVA 1.1 Developer's Guide," Second Edition, Sams.net Publishing, 1997; pp. 293-294.

Lam, Richard B., "Share Memory and Message Queues", Dr. Dobb's Journal on CD-Rom, Mar. 1995 p. 2-3.

Nakano, R. et al., "Runtime Support for Extended Types in C ++", IEEE, pp. 351-359.

Newton, Harry, Newton's Telecom Dictionary, 8.sup.th Ed, Flatiron Publishing, 1994, pp. 333 and 870.

Non Final Office Action for U.S. Appl. No. 09/114,231 dated Oct. 3, 2002.

Non Final Office Action for U.S. Appl. No. 09/114,231 dated Feb. 13, 2004.

Non Final Office Action for U.S. Appl. No. 10/991,723 dated Aug. 1, 2008.

Non Final Office Action for U.S. Appl. No. 10/991,723 dated Sep. 7, 2007.

Non Final Office Action fro U.S. Appl. No. 10/992,461 dated May 13, 2009.

Richter, Jeffrey, Advanced Windows: The Professional Developers Guide to the Win32 API for Windows NT 4.0 and Windows 95, Chapter 11: Window Messages and Asynchronous Input, pp. 461-528, Microsoft Press, Redmond, Washington, 1997.

Sinha, Alok K., Networking Programming in Windows NT, Chapter 5: Windows Sockets in Windows NT, pp. 199-299, Addison-Wesley Publishing Company, Reading, Massachusetts, 1996.

Tanenbaum, Andrew S., Computer Networks, Third Edition, Prentice Hall, New Jersey; pp. 577-622, 1996.u.

Tarjan, Robert Endre, Data Structures and Network Algorithms, Chapter 3: Heaps, pp. 33-43, Society for Industrial and Applied Mathematics, Philadelphia, Pennsylvania, 1993.

* cited by examiner

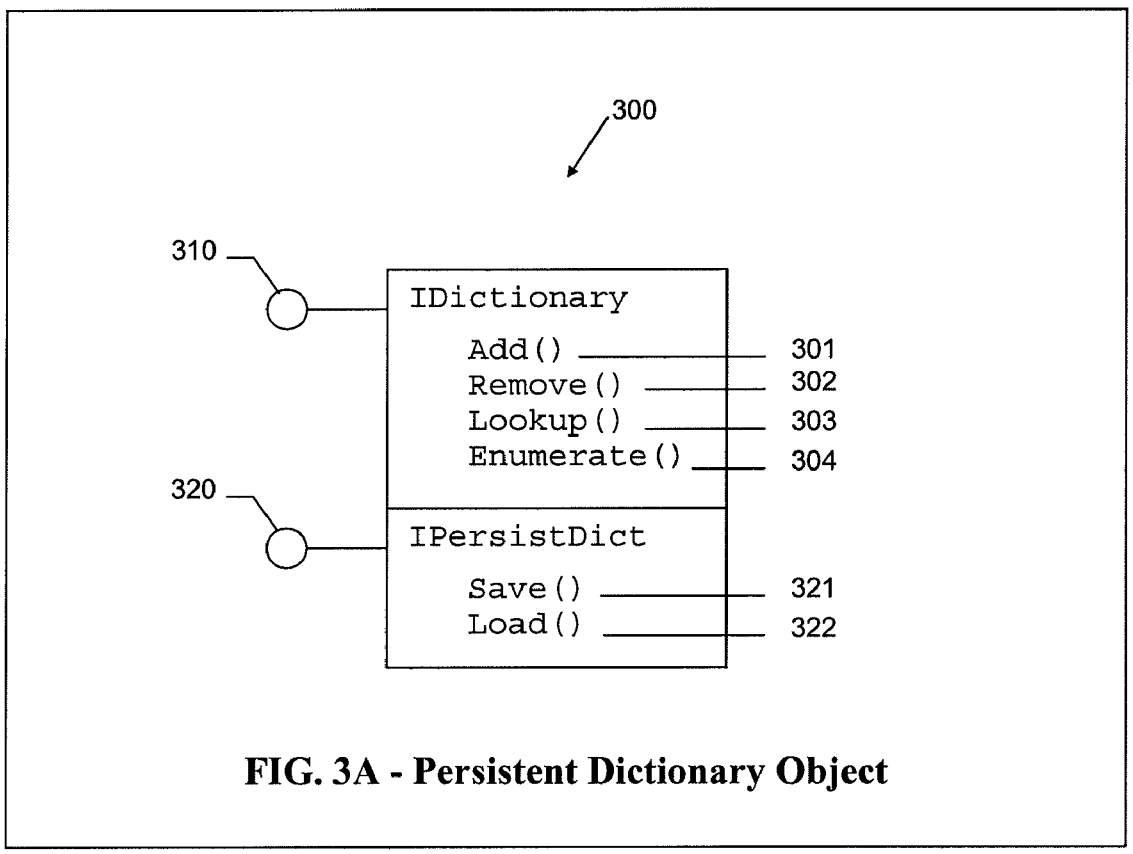
FIG. 3A - Persistent Dictionary Object
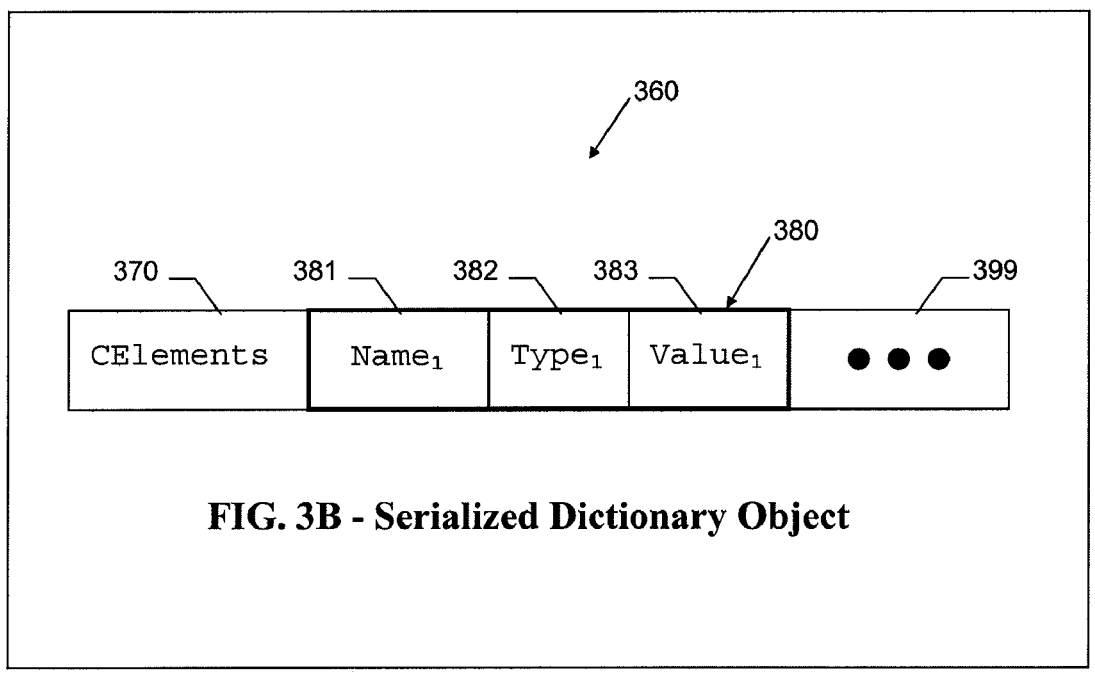
FIG. 3B - Serialized Dictionary Object

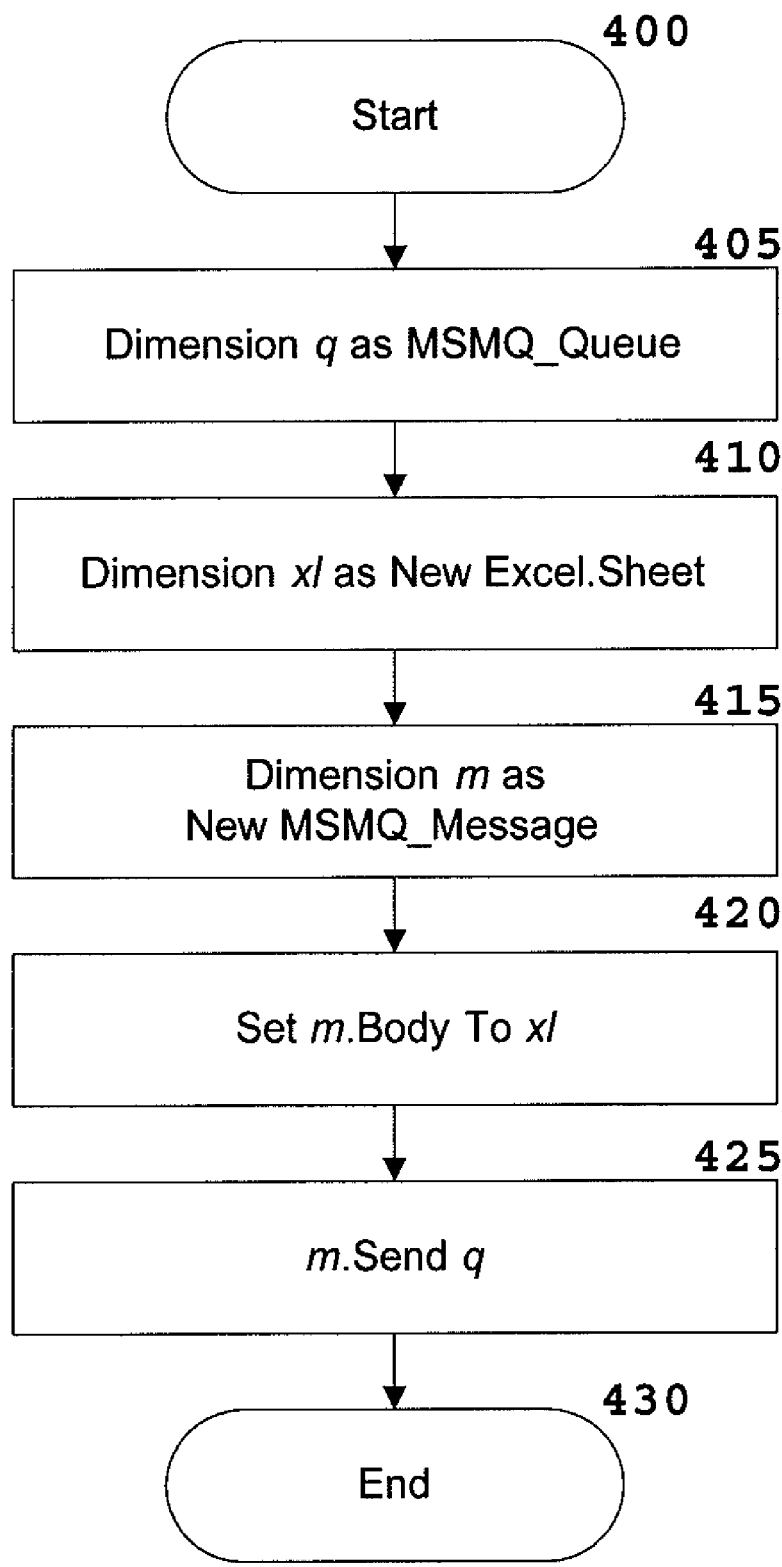
FIG. 4A - Sending Application

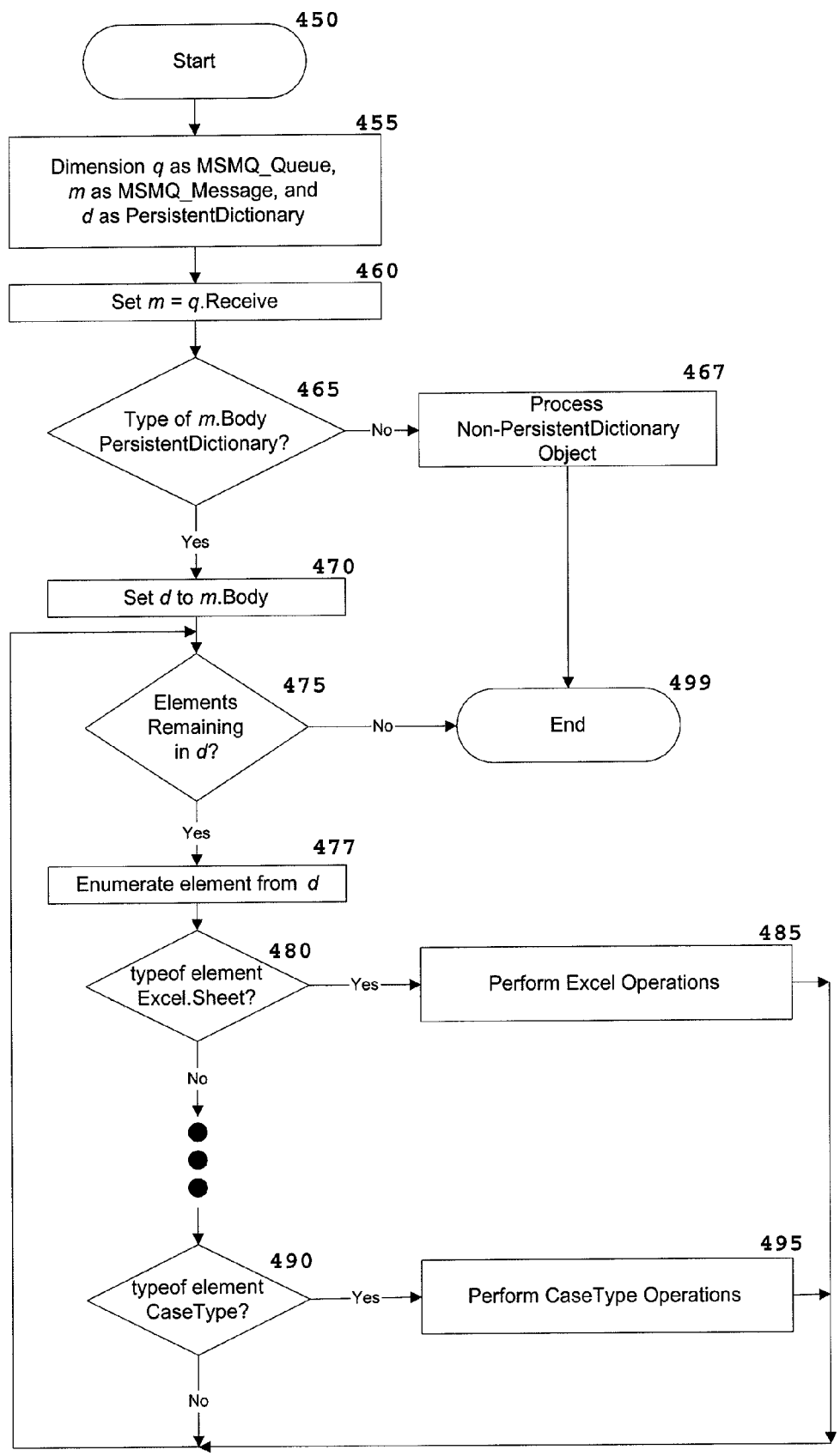
FIG. 4B - Receiving Application

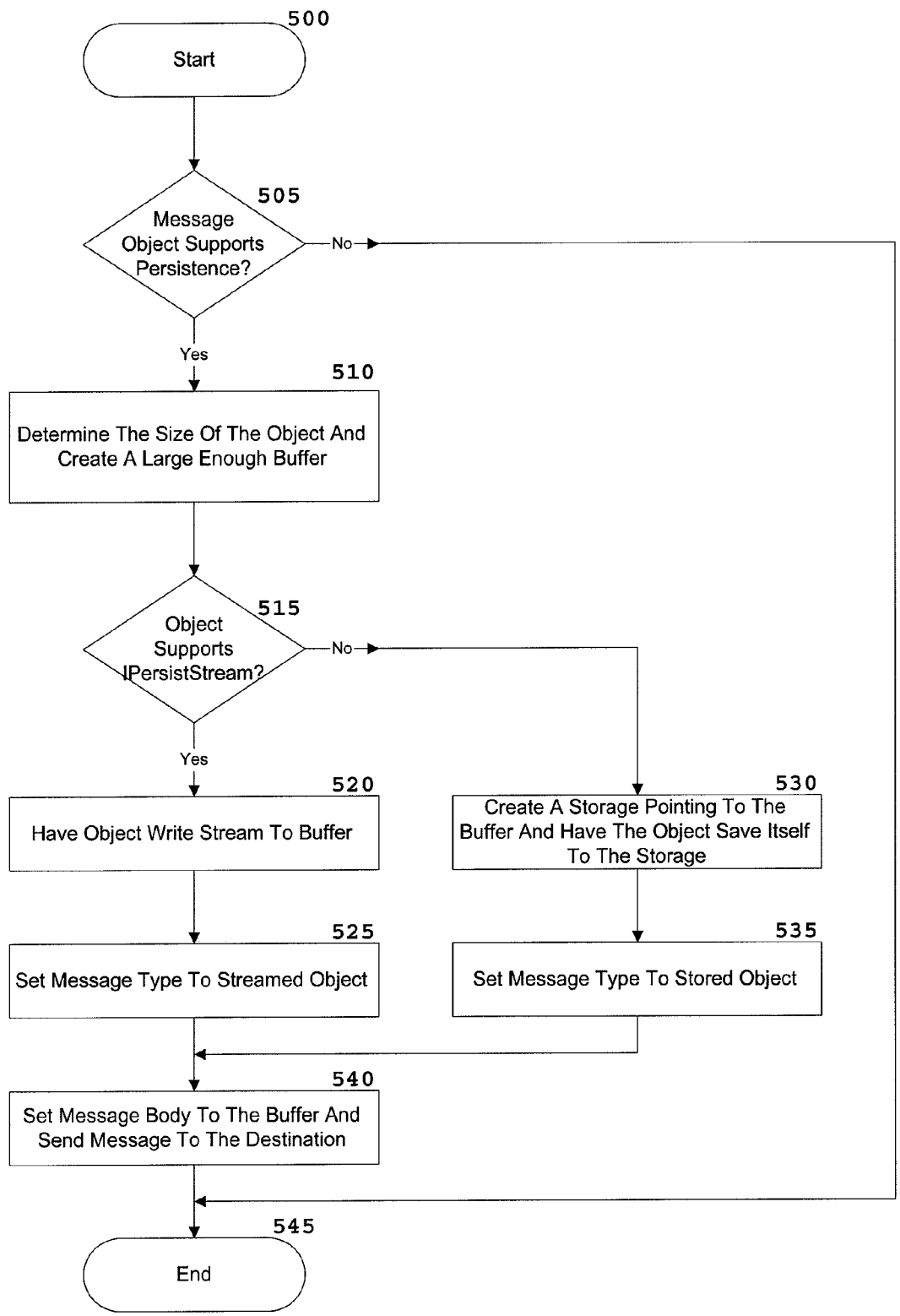
FIG. 5A - MSMQ Sending a Message Object

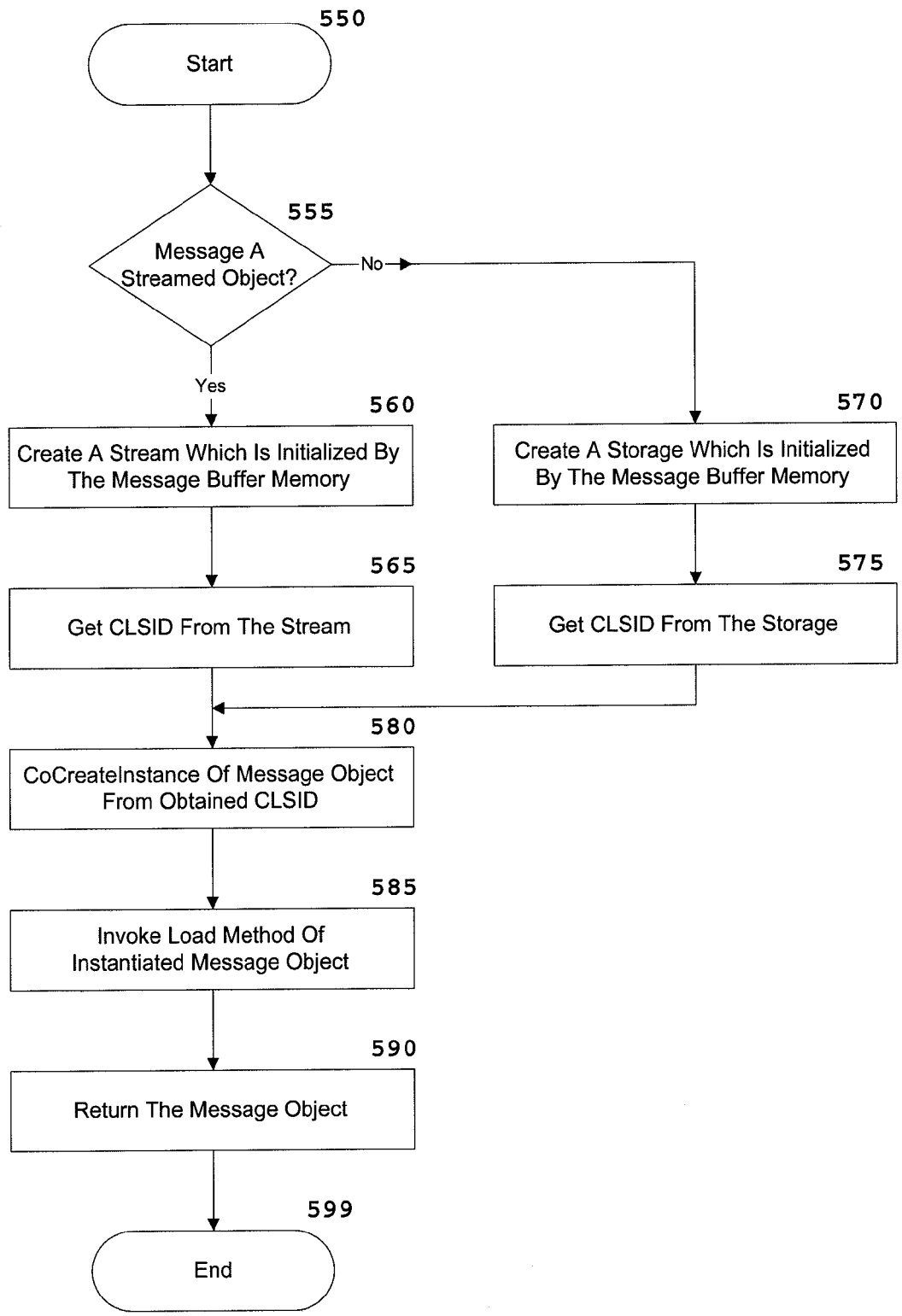
FIG. 5B - MSMQ Receiving a Message Object

METHOD AND APPARATUS FOR CREATING, SENDING, AND USING SELF-DESCRIPTIVE OBJECTS AS MESSAGES OVER A MESSAGE QUEUING NETWORK

CROSS REFERENCE TO RELATED APPLICATION(S)

This application is a continuation of U.S. patent application Ser. No. 10/991,723, filed on Nov. 18, 2004, which is a continuation of U.S. patent application Ser. No. 09/114,231, filed Jun. 30, 1998, now issued as U.S. Pat. No. 6,848,108, the contents of both are hereby incorporated by reference.

FIELD OF THE INVENTION

This invention relates to computer programming and networking, and more particularly to an automated method and computer apparatus for sending and using self-descriptive objects as messages over a message queuing network.

BACKGROUND OF THE INVENTION

Users and developers of networked applications and systems desire reliable, faster and easier to use methods of communicating information between source and destination computer applications and operating environments. Traditional messaging techniques require each application to know the specific serialized format of a message, or require communication between the operating environments of the sender and receiver to provide information or meta-data so that the receiver can interpret the message. Computer users and applications developers are desirous of new methods and computer apparatus for communicating messages which decrease the amount of configuration and runtime overhead involved.

Most distributed computing applications today use synchronous communication technologies, such as remote procedure calls. Such synchronous communications require a sender of a request to wait for a response from the receiver of the request before it can proceed and perform other tasks. The time that the sender must wait depends on the time it takes for the receiver to process the request and return a response. Synchronous communication mechanisms also require the sender and the receiver to be operating simultaneously.

In contrast, using asynchronous communications, senders make requests to receivers and can move on to perform other tasks immediately. If a response is expected back from the receiver, it is up to the original sender to decide when it will actually look for and process the response. Most importantly, there is no guarantee that receivers will process requests within any particular period of time. In fact, with asynchronous communications, there are no requirements that receivers be running nor even the communications infrastructure be available in order for a sender to initiate a request.

Message queuing systems implement asynchronous communications by enabling applications to send messages to and receive messages from other applications. These applications may be running on the same machine or on separate machines connected by a network. When an application receives a request message, it processes the request by reading the contents of the message formatted in a known pattern and acting accordingly. If required, the receiving application can send a response message back to the original requester.

Many applications are now using message queuing networks for the enhanced communication delivery reliability between networked computer systems provided by sending messages asynchronously across a message queuing enterprise network. However, these messages are simply received as type-less buffers of raw data that are passed between applications. In some instances, these messages have additional signaling information attached that describe how the message should be sent by the underlying sub-system. However, the messages do not provide any semantic information that enables the message recipient to interpret the meaning of the message contents. To communicate, the source and destination applications rely either on private message content encoding schemes or prior arrangements between the applications to only send messages of a certain type.

SUMMARY OF THE INVENTION

According to the invention, an automated method and apparatus are provided for creating, sending, and using self-descriptive objects as messages between applications, and additionally sending these message objects over a message queuing network. Required meta-information is included with these self-descriptive messages making them self-contained and requiring no external components to interpret them. Using the present invention, networked applications can communicate arbitrary objects in a standard way with no prior agreement as to the nature and semantics of message contents. In this manner, applications are more robust and can readily adapt to changes to message contents without having to update the format or structure of the message, or to update the application to interpret the encoded body of a new message format.

In one embodiment of the present invention, messages are sent as serialized dictionary objects over a message queuing network. The dictionary represents an abstract data type defined in terms of four fundamental operations that can be performed on it, namely: add, remove, lookup, and enumerate. These operations correspond to methods invoked to perform the desired operation. As implied by the method names, add( ) adds a specified element to the dictionary; remove( ) removes a specified element in the dictionary; lookup( ) finds a specified element in the dictionary; and enumerate( ) returns one element from the dictionary, allowing the retrieval of all elements from the dictionary.

The dictionary elements, in an embodiment of the present invention, are in the form of a triplet comprised of a Name, Type and Value. The Name represents a string identifier; the Type specifies the type of element which could be as simple as a constant or integer, or be a more complex (and very rich) type such as an Excel spreadsheet or even another serialized data dictionary; and the Value specifies a current value or state of the element. The previously described triplet merely illustrates a very generalized abstract data element. Various other dictionary data elements could be employed in keeping with the present invention.

To enable the dictionary object to be sent across a network, the dictionary object is able to serialize and deserialize itself using two more of its methods. The save( ) method causes the dictionary object to serialize itself to the body of a message, and the load( ) method loads into the object a previously serialized dictionary object located in the body of a received message.

In accordance with the present invention, a sender application creates a persistent dictionary object, and populates the object with the desired contents of the message. The sender application then requests the dictionary object to save or serialize itself into the body of a message queuing message (or the dictionary object could be serialized into a buffer which is copied or moved into the body of a message queuing message prior to sending the message). The message queuing system forwards the message containing the serialized object to the destination queue.

Upon receipt from the destination queue, the receiving message queuing system looks at the received message, and determines that it contains a dictionary object in the body of the message. The destination message queuing system then instantiates and loads the message object with the data dictionary, and passes the object to the recipient application.

The recipient application then uses the dictionary object in any manner it chooses. In one embodiment of a recipient application, the recipient application enumerates the elements of the data dictionary and takes appropriate programming action for each element according to its type. For example, a received Excel spreadsheet in a dictionary element could cause the application to start an Excel application and to forward the value of the element (i.e., the Excel spreadsheet) to the Excel application. Other dictionary elements might contain a single integer, or records containing multiple fields which would be processed accordingly by the recipient application. Thus, the present invention provides a generalized and robust messaging mechanism whereby the sending and receiving applications no longer rely on a previous agreed to protocol format or a specialized serialization scheme.

BRIEF DESCRIPTION OF THE DRAWINGS

The appended claims set forth the features of the present invention with particularity. The invention, together with its advantages and as previously described, may be better understood from the following detailed description taken in conjunction with the accompanying drawings of which:

FIG. 3A is a block diagram illustrating the an embodiment of a persistent dictionary object with its interfaces and methods;

FIG. 3B is a block diagram illustrating an exemplary format of the serialized dictionary object;

FIG. 4A is a flow diagram illustrating the steps performed by an application to send a message object;

FIG. 4B is a flow diagram illustrating the steps performed by an application using a received message object;

FIG. 5A is a flow diagram illustrating the steps performed by a MSMQ server to serialize and send a message object; and FIG. 5B is a flow diagram illustrating the steps taken by a MSMQ server in response to receiving a serialized message object.

DETAILED DESCRIPTION OF THE PREFERRED EMBODIMENT

Figure 1:
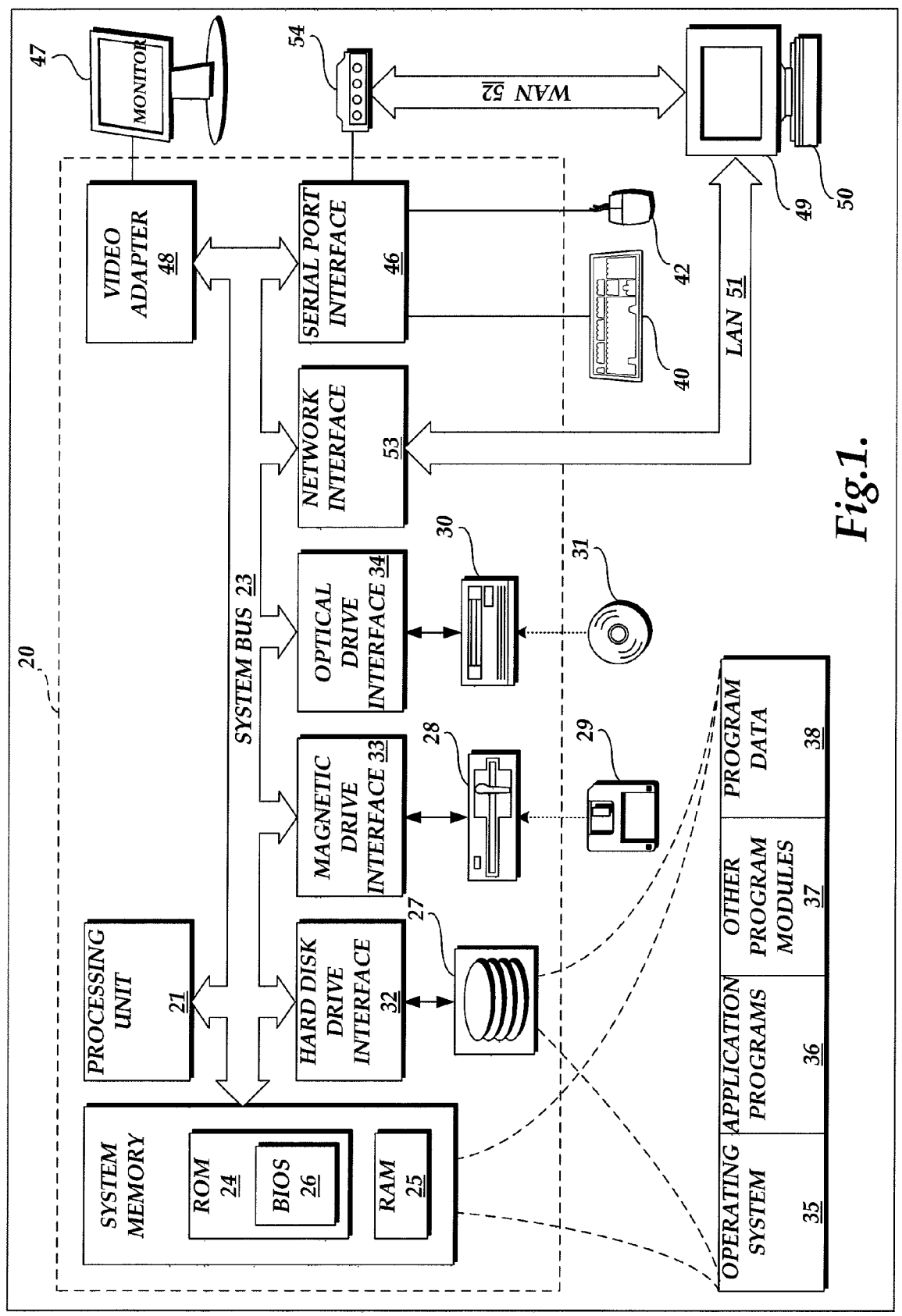
FIG. 1A is a block diagram of an exemplary operating environment in which the invention may be implemented, including a computer network comprising computer systems for sending and using self-descriptive objects as messages over a message queuing network in accordance with the invention.

FIG. 1 and the following discussion are intended to provide a brief, general description of a suitable computing environment in which the invention may be implemented. Although not required, the invention will be described in the general context of computer-executable instructions, such as program modules, being executed by a personal computer. Generally, program modules include routines, programs, objects, components, data structures, etc. that perform particular tasks or implement particular abstract data types. Moreover, those skilled in the art will appreciate that the invention may be practiced with other computer system configurations, including hand-held devices, multiprocessor systems, microprocessor-based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a general purpose computing device in the form of a conventional personal computer 20, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read only memory (ROM) 24 and random access memory (RAM) 25. A basic input/output system 26 (BIOS) containing the basic routines that helps to transfer information between elements within the personal computer 20, such as during start-up, is stored in ROM 24. In one embodiment of the present invention on a server computer 20 with a remote client computer 49, commands are stored in system memory 22 and are executed by processing unit 21 for creating, sending, and using self-descriptive objects as messages over a message queuing network in accordance with the invention. The personal computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide nonvolatile storage of computer readable instructions, data structures, program modules and other data for the personal computer 20. Although the exemplary environment described herein employs a hard disk, a removable magnetic disk 29 and a removable optical disk 31, it should be appreciated by those skilled in the art that other types of computer readable media which can store data that is accessible by a computer, such as magnetic cassettes, flash memory cards, digital video disks, Bernoulli cartridges, random access memories (RAMs), read only memories (ROM), and the like, may also be used in the exemplary operating environment.

A number of program modules may be stored on the hard disk, magnetic disk 29, optical disk 31, ROM 24 or RAM 25, including an operating system 35, one or more application programs 36, other program modules 37, and program data 38. A user may enter commands and information into the personal computer 20 through input devices such as a keyboard 40 and pointing device 42. Other input devices (not shown) may include a microphone, joystick, game pad, satellite dish, scanner, or the like. These and other input devices are often connected to the processing unit 21 through a serial port interface 46 that is coupled to the system bus, but may be collected by other interfaces, such as a parallel port, game port or a universal serial bus (USB). A monitor 47 or other type of display device is also connected to the system bus 23 via an interface, such as a video adapter 48. In addition to the monitor, personal computers typically include other peripheral output devices (not shown), such as speakers and printers.

The personal computer 20 may operate in a networked environment using logical connections to one or more remote computers, such as a remote computer 49. The remote computer 49 may be another personal computer, a server, a router, a network PC, a peer device or other common network node, and typically includes many or all of the elements described above relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, intranets and the Internet.

When used in a LAN networking environment, the personal computer 20 is connected to the local network 51 through a network interface or adapter 53. When used in a WAN networking environment, the personal computer 20 typically includes a modem 54 or other means for establishing communications over the wide area network 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

The present invention provides for sending self-descriptive message objects as messages between two or more applications, and operates in any computing environment that supports data objects, whether on a standalone computer or preferably in a networked environment. Using self-descriptive objects as messages, a recipient no longer relies on a convention or a special-coding serialization scheme. The recipient application can simply extract a data element from the received object in a standard, well-known way, discover the element's logical type, and take appropriate programmatic action.

The present invention is described in the context of a Microsoft Message Queue Server (MSMQ) network and using Microsoft Component Object Model (COM) objects in order to illustrate one embodiment of the invention. The present invention is not so limited, as the teachings disclosed herein provide for the present invention to be used in other messaging systems and communications networks, as well as using other forms of objects and self-descriptive structures.

A brief introduction of message queuing is provided below. A more detailed explanation of MSMQ is described in "Microsoft Message Queue Server (MSMQ)," MSDN Library—April 1998, Microsoft Corporation, and is hereby incorporated by reference. And a detailed explanation of COM is described in described in "COM and ActiveX Object Services," MSDN Library—April 1998, Microsoft Corporation, and is hereby incorporated by reference.

MSMQ implements asynchronous communications by enabling applications to send messages to, and receive messages from, other applications. These applications may be running on the same machine or on separate machines connected by a network. MSMQ messages can contain data in any format that is understood by both the sender and the receiver. When an application receives a request message, it processes the request by reading the contents of the message and acting accordingly. If required, the receiving application can send a response message back to the original requestor.

While in transit between senders and receivers, MSMQ keeps messages in holding areas called queues, hence the name message queuing. MSMQ queues protect messages from being lost in transit and provide a place for receivers to look for messages when they are ready. Applications make requests by sending messages to queues associated with the intended receiver. If senders expect responses in return, they must include the name of a response queue (that the sender must create in advance) in all requests that they make to the receiver.

Figure 2A:
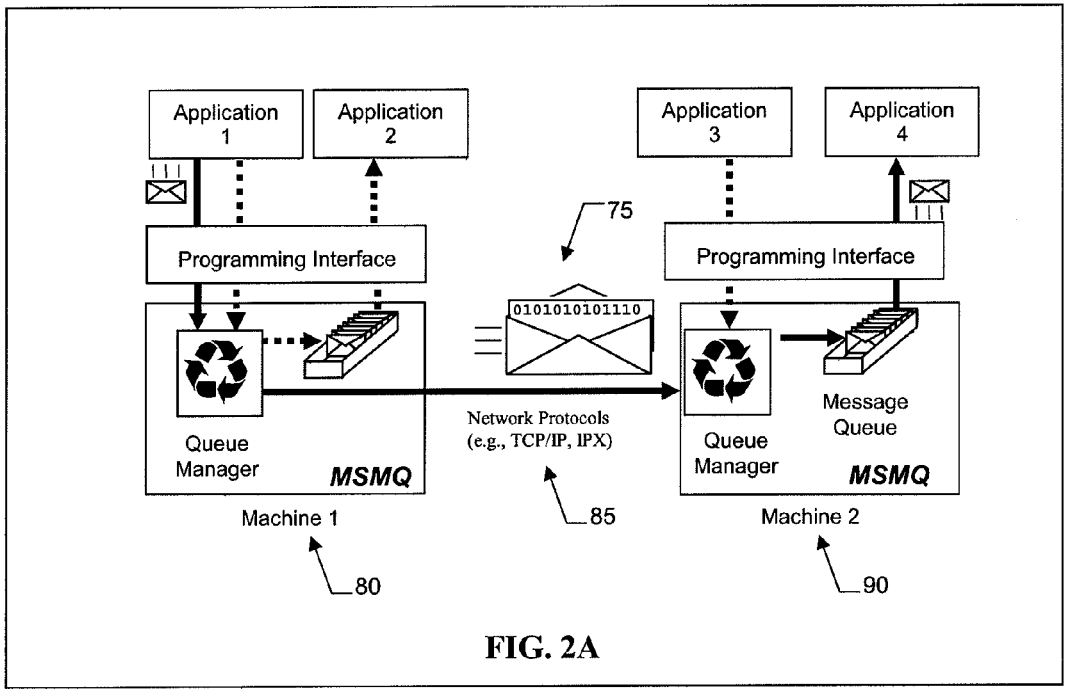
FIG. 2A is a block diagram illustrating the transmission of messages in a message queuing environment.

Turning now to FIG. 2A, shown is a block diagram illustrating the basics of the transportation of a message 75 from message queuing machine 1 (computer 80) to machine 2 (computer 90) over a transport network 85 supporting such network transport protocols as TCP/IP or IPX. The message 75 contains self-descriptive objects and/or self-descriptive data elements in accordance with the present invention. Each computer 80 and 90 performs both server and client operations for transferring messages 75 between their respective message queues.

A message queuing enterprise network can span many locations and operate on top of different transport network protocols. The topology of the message queuing enterprise network can be described in terms of (1) physical location and (2) communication protocol connectivity. The term "site" describes an aspect of the enterprise network based on a physical location. In contrast, a "connected network" describes an aspect of the message queuing enterprise network according to communication protocol connectivity.

An enterprise network is a collection of sites connected through slow/expensive network connections. A site, is a physical collection of machines, where communication between two machines is cheap and fast. These two computers are typically located in the same physical location, although not required. The concept of a site is integral to the message routing algorithm employed by the message queuing system. In order to route messages throughout the message queuing enterprise network, a message queuing computer must be able to locate the destination message queue. A subset of computers within the message queuing network are also directory servers ("DS servers") which maintain message queuing information, including information to enable routing of messages such as sites, connected networks, and names of DS servers within the message queuing network.

A MSMQ network is a collection of addresses "speaking" several communication protocols and are connected by physical communication links. A connected network is a collection of addresses, where every two addresses can communicate directly (i.e., the underlying communication network provides the connection if all its components are on-line). Inside a connected network, communication delay and cost may vary. The physical communication lines and the traffic overhead define the communication delay and cost. Two addresses in a connected network may be connected by a fast, cheap line, for example, if their machines are in the same site or by a slow expensive line if their machines are in different sites. Two machines belong to the same connected network if they support the same protocol, and can have a direct session on that protocol. A machine can support more than one connected network on a specific protocol if it supports more than one address which belong to different connected networks on a specific protocol. A connected network does not consist of more than one protocol.

Figure 2B:
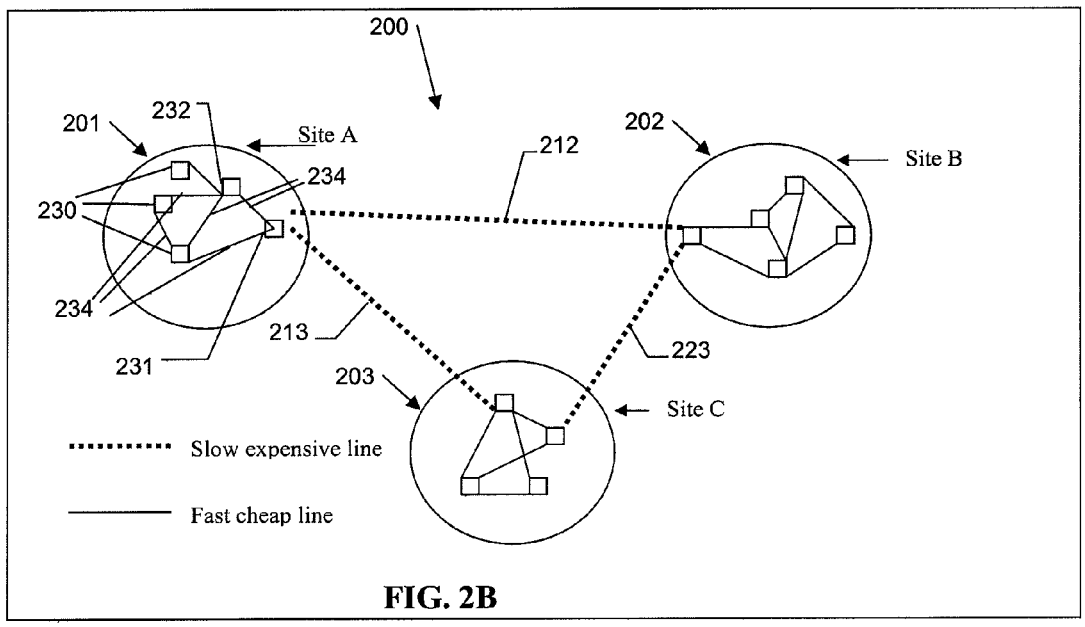
FIG. 2B is a block diagram illustrating sites within a message queuing environment.
Figure 2C:
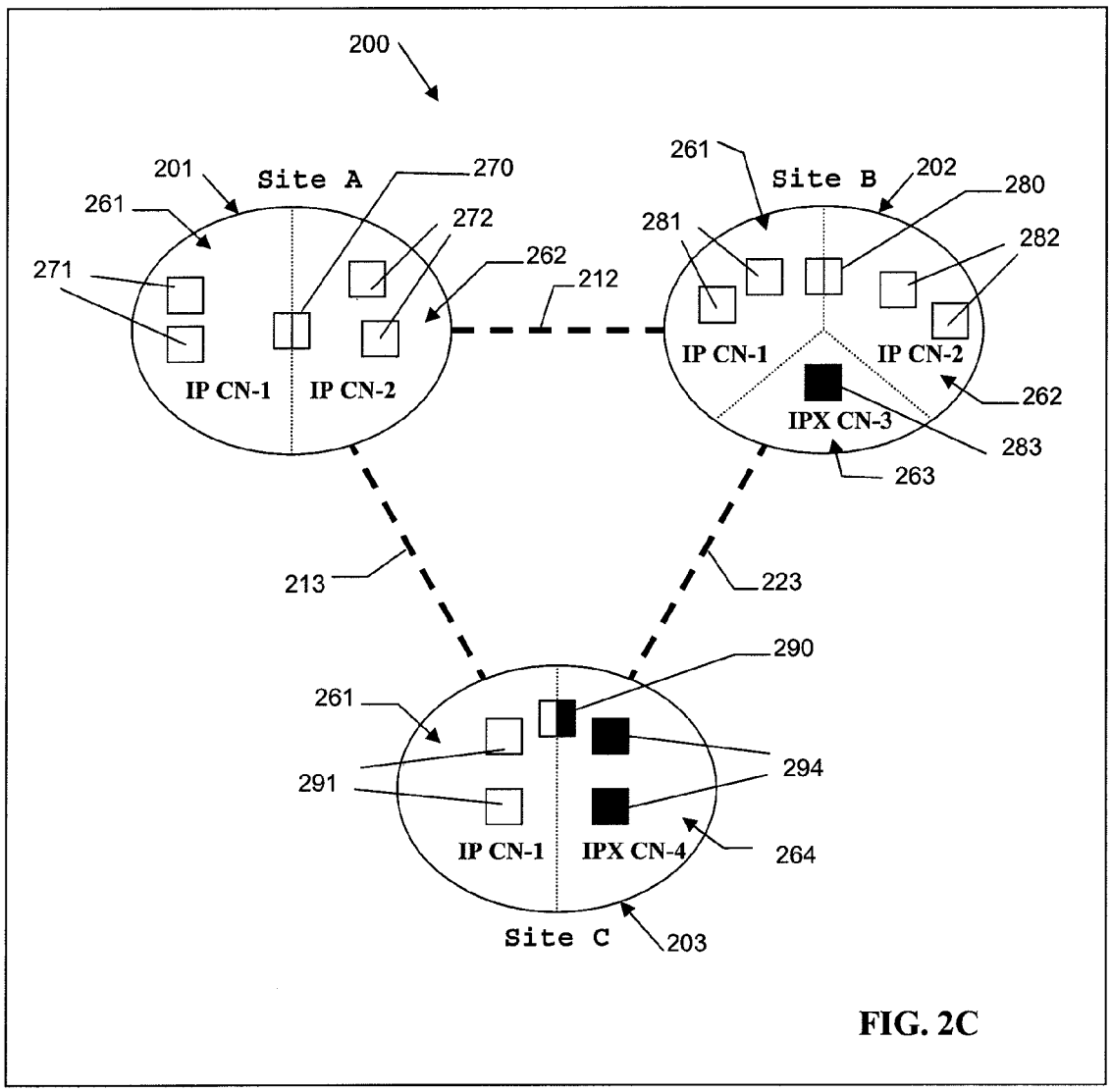
FIG. 2C is a block diagram illustrating connected networks within a message queuing environment.

These concepts are further illustrated in FIGS. 2B-C, shown in block diagrams illustrating an enterprise network 200. As illustrated in FIG. 2B, shown are three sites: site A (201), site B (202), site C (203), connected by network lines 212, 213, and 223. As previously described herein, sites are a grouping of computers within a message queuing network grouped together for the purposes of routing. One distinction that can be made between sites in a typical message queuing network is that sites are connected to relatively slow, expensive lines. Computers within a site are typically connected by fast, cheap lines such as those computers residing on a single Ethernet. For example, site A (201) contains a plurality of message queuing computers 230, 231 connected by fast networking lines 234. These computers can also perform additional message queuing functionality. For example, computer 231 might be a DS server. In addition, computer 232 might be a remote access server (RAS) with software to respond to client requests packets.

Turning now to FIG. 2C, illustrated is an enterprise network 200 showing sites A-C (201-203) and connected networks 261-264. As previously described herein, each connected network within a message queuing network represents those machines which can directly communicate with each other using a single networking protocol, such as TCP/IP or IPX. As shown in FIG. 2C, computers 270-272, 280-282 and 290-291 support TCP/IP protocol, and computers 283, 290, 294 support IPX protocol. A computer can use more than one protocol as represented by computer 290, or support more than one network interface for the same protocol as represented by computers 270 and 280. In addition, a computer can be connected to more than one connected network. For example, computers 270 and 280 belong to two connected IP networks 261 and 262; and computer 290 belongs to two connected networks 261 and 264 supporting IP and IPX protocols. It is also possible for a connected network to span all sites, such as illustrated by connected network 261 spanning sites A-C (201-203).

In one embodiment of the present invention, messages are sent as serialized dictionary objects over a message queuing network. The dictionary represents an abstract data type defined in terms of four fundamental operations that can be performed on it, namely: add, remove, lookup, and enumerate; with the addition of two operations to serialize and unserialize the persistent dictionary object to enable the dictionary object to be sent across a network.

Turning now to FIG. 3A, shown is a block diagram illustrating persistent dictionary object 300 comprising an IDictionary interface 310 and an IPersistDict interface 320. The dictionary object 300 contains a data structure and methods that when invoked, perform operations on the internal data structure. The operations performed on the data elements correspond to methods invoked to perform the desired operation. As implied by the method names, add( ) 301 adds a specified element to the dictionary; remove( ) 302 removes a specified element in the dictionary; lookup( ) 303 finds a specified element in the dictionary; and enumerate( ) 304 provides a mechanism for obtaining the next element from the dictionary given a position in the dictionary. To enable the dictionary object to be sent across a network, the save( ) method 321 causes the dictionary object to serialize itself to a specified target location (i.e., the message body) and the load( ) method 322 loads a serialized dictionary object.

The dictionary elements, in an embodiment of the present invention, are in the form of a triplet comprised of a Name, Type and Value. The Name represents a string identifier; the Type specifies the type of element which could be as simple as a constant or integer, or be a more complex (and very rich) type such as an Excel spreadsheet or even a serialized data dictionary; and the Value specifies a current value or state of the element. In an embodiment, the type field contains an agreed upon indicator specifying the type of element (e.g., 1 is an integer, 2 is a string, 3 is an object, etc.). In another embodiment, the type mechanism is extended to provide a standard way for receivers to learn about type indicators that the receiver does not recognize such as by querying the sending application, the message queuing network, or some other local or remote process.

For example, a record of data such as an address book entry could be sent as a persistent dictionary object, with the address book entries being defined in terms of two dictionary elements. The first dictionary element having a Name of "Entry Name", being of Type "string", and having a Value of "USPTO"; with the second dictionary element having a Name of "City", being of Type "string", and having a Value of "Washington D.C.". Using Visual Basic and dimensioning d as a New Persistent Dictionary, the elements could be added to d using the statements:

d.Add("Entry Name", "USPTO"), and d.Add("City", "Washington D.C.").

Then, the elements could be extracted from d by the following references: d("Entry Name") and d("City").

Using the previously described triplet as a data element merely illustrates a very generalized abstract data element. Various other dictionary data elements could be employed in keeping with the present invention. In addition, late binding techniques could be used to make each named element in the data dictionary a data member of the object. Using this technique, elements of the dictionary could be referenced directly. For example, a data element msword_document in a dictionary d could be referenced as d.msword_document as opposed to d("msword_document").

Turning now to FIG. 3B, illustrated is a serialized dictionary object 360. The first field, CElements 370, contains the number of elements in the serialized dictionary object 360, which is followed by each of the dictionary elements. As shown, the first dictionary element 380 comprises the triplet of the Name 381, Type 382 and Value 383. A dictionary object can contain a plurality of dictionary elements as indicated by element field 399.

FIGS. 4A, 5A, 5B, and 4B illustrate the steps performed by a sending application, the sending MSMQ server, the receiving MSMQ server, and the recipient application, respectively, in sending a message object from a sending application to a recipient application over a MSMQ network in one embodiment. In other embodiments, certain of these described functions could be performed by the application instead of the message queuing network and vice versa. For example, the serialization and deserialization of the persistent dictionary object could be performed by the sending and recipient applications (or by other intermediate protocol layers, or by other processes). In this example, the message queuing network would not necessarily need to know that it was transporting a self-descriptive message. Moreover, self-descriptive messages (e.g., persistent dictionary objects) could be transported using other network technologies and protocols, in addition to, or in place of the message queuing network described herein.

First, turning to FIG. 4A, illustrated are the steps performed by a Microsoft Visual Basic application preparing and sending a message object containing an Excel spreadsheet across a MSMQ network. First, a MSMQ queue q, an Excel spreadsheet xl, and a MSMQ message m are dimensioned in steps 405-415. Next, the body of the message m is set to the Excel spreadsheet xl in step 420. Finally, in step 425, the MSMQ message m is sent via queue q.

Next, turning to FIG. 5A, the sending MSMQ server continues in response to the request to send the message object by the sending application in step 420 (FIG. 4A). First, in step 505, the message object is checked to see if it supports data persistence (such as being a COM object). If it does not support data persistence, then the object is not sent in one embodiment and processing ends with step 545. In other embodiments, it would be possible to add additional functionality based on the teachings disclosed herein to incorporate serialization and unserialization of arbitrary objects.

Otherwise, if the message object supports persistence as determined in step 505, then the required size of a buffer is determined and allocated in step 510 to accommodate the serialized message object. Next, in step 515, the persistent storage type supported by the message object is determined. If the message object supports streams, then processing flows to steps 520-525 wherein the message object writes itself to the buffer, and the message type is set to a "streamed object". Otherwise, the message object supports storage (the other storage type for a COM object) and processing continues with steps 530-535 wherein a storage pointing to the message buffer is created, the object saves itself to the storage (i.e., the message buffer), and the message type is set to a "stored object". Finally, in step 540, the MSMQ message body is set to the contents of the buffer and the MSMQ server forwards the message to the destination queue.

When such a message object is received at a receiving MSMQ server queue and the message has been determined to contain an object by querying the message itself using a method of the message, the message is processed according to the flow diagram of FIG. 5B. In step 555, the object message type is evaluated and if it is of a "streamed object" type, then processing continues with steps 560-565 wherein the received message object creates a stream which is initialized by the message buffer memory, and a class identifier (CLSID) is obtained from the stream. Otherwise, the object message is of a "storage object" type, and steps 570-575 are performed wherein the received message object creates a storage which is initialized by the message buffer memory, and a class identifier (CLSID) is obtained from the storage.

Next, in step 580, the OLE interface CoCreateInstance is used to instantiate the message object (i.e., the persistent dictionary object). Then, the load method 322 (FIG. 3A) of the instantiated object is invoked to load the serialized data (from the appropriate initialized storage or stream that was created in step 560 or 570) in step 585. Finally, in step 590, the receiving MSMQ server returns the message object (i.e., the instantiated and loaded dictionary object) to the recipient application in step 590.

The recipient application then uses the received self-contained message object as described herein with reference to the flow diagram of FIG. 4B. First, in step 455, a MSMQ queue q, a MSMQ message m, and a persistent data dictionary d are dimensioned. Next, in step 460, m is set to the message received from the sender application via the MSMQ network as explained herein with reference to FIGS. 4A, 5A and 5B. Having obtained the message m containing the self-descriptive object, the recipient application processes the message however it desires.

The remaining steps 465-499 illustrate one embodiment of such processing. First, if the body of the received message is not a persistent dictionary as determined in step 465, then the non-persistent data object (e.g., an integer, record, string) is processed by the application. For example, the recipient application could print the address book previously described herein by setting d to the message body of a received message containing an address book entry, and then using the statement:

print The d("Entry Name") is in d("City") which would print:

The USPTO is in Washington D.C.

Otherwise, the received message is a persistent dictionary as determined in step 465, and d is set to the message body in step 470. Next, while there are elements remaining in the persistent dictionary d, steps 477-495 are performed for each element. In step 477, an element is enumerated from the data dictionary. Next, steps 480-495 are performed which embody a case statement switching upon the typeof( ) the element (i.e., the type of the persistent dictionary element received in the MSMQ message). For example, if the type of the element is an Excel spreadsheet, then Excel operations are performed. Otherwise, processing continues in the case statement with a generic type "CaseType" provided for illustrative purposes in steps 490, 495 to signify the diverse and rich types of elements that can be sent across a network in a self-descriptive message using the present invention. This CaseType could be any data type, including an integer, string, data record, address book entries, or even a persistent dictionary. Many different configurations are also possible, including the recipient application being a CaseType application and processing the received element, or a CaseType application being invoked by the recipient application or message queuing system to process the received the data element.

In view of the many possible embodiments to which the principles of our invention may be applied, it will be appreciated that the embodiment described herein with respect to the drawing figures is only illustrative and should not be taken as limiting the scope of the invention. To the contrary, the invention as described herein contemplates all such embodiments as may come within the scope of the following claims and equivalents thereof.

What is claimed is:

1. A system for sending messages in an enterprise network having sites and connected networks, the system comprising:
   a directory server for storing message queuing information, wherein message queuing information comprises information about one or more sites and connected networks associated with the enterprise network to enable routing of messages;
   a first MSMQ queue for receiving a message from a sending application; and
   a second MSMQ queue for receiving the message from the first MSMQ queue and storing the message until a recipient application requests the message, wherein the second MSMQ queue uses a TCP/IP protocol to communicate with the first MSMQ queue and the message includes a name of a response queue that is different from the first MSMQ queue.

2. The system of claim 1, wherein the response queue is a third MSMQ queue.

3. The system of claim 2, wherein the third MSMQ queue is a destination queue for the sending application.

4. The system of claim 2 further comprising a fourth MSMQ queue for receiving a response message from the recipient application, wherein the recipient application communicates with the fourth MSMQ queue using the TCP/IP protocol.

5. The system of claim 4, wherein the fourth MSMQ queue sends the response message to the third MSMQ queue.

6. The system of claim 5, wherein the sending application retrieves the response message from the third MSMQ queue.

7. The system of claim 1, wherein the message is a self-descriptive message.

8. The system of claim 7, wherein the self-descriptive message comprises a dictionary object.

9. In a message queuing network comprising a first MSMQ queue and a second MSMQ queue, a method comprising the steps of:
- receiving by way of TCP/IP a self-descriptive message at the second MSMQ queue from the first MSMQ queue; and
- storing the self-descriptive message at the second MSMQ queue until a direct connection is established with a recipient application, wherein the self-descriptive message includes a name of a response queue that is different from the first MSMQ queue.

10. The method of claim 9, further comprising receiving a response message from the recipient application at a third MSMQ queue.

11. The method of claim 10, further comprising sending the response message from the third MSMQ queue to a fourth MSMQ queue.

12. The method of claim 11, further comprising storing the response message at the fourth MSMQ queue until a direct connection is established with the sending application.

13. The method of claim 12, further comprising sending the response message to the sending application from the fourth MSMQ queue.

14. The method of claim 9, wherein the self-descriptive message comprises a dictionary object.

15. The method of claim 9, wherein the self-descriptive message is serialized.

16. The method of claim 15, wherein the second MSMQ queue unserializes the self-descriptive message after receiving the self-descriptive message.

17. The method of claim 9, further comprising sending the self-descriptive message to the recipient application from the second MSMQ queue.

18. A system in an enterprise network for sending self-descriptive messages having sites and connected networks, the system comprising:
- a directory server for storing message queuing information, wherein the message queuing information comprises information about one or more sites and connected networks associated with the enterprise network to enable routing of self-descriptive messages;
- a first MSMQ queue on a first machine for receiving self-descriptive messages over a TCP/IP protocol from a sending application;
- a second MSMQ queue on a second machine for receiving the self-descriptive message over the TCP/IP protocol from the first MSMQ queue, wherein the second MSMQ queue stores the self-descriptive message until a recipient application requests the self-descriptive message;
- a third MSMQ queue on a third machine for receiving a response message over the TCP/IP protocol from the recipient application, wherein the third MSMQ queue is identified by the self-descriptive message; and
- a fourth MSMQ queue for receiving the response message over the TCP/IP protocol from the third MSMQ queue, the fourth MSMQ queue storing the response message until a connection is established with the sending application, wherein the fourth MSMQ queue sends the response message to the sending application upon a request of the sending application.

19. The system of claim 18, wherein the self-descriptive message comprises a dictionary object.

20. The system of claim 18, wherein the sending application resides on the first machine.

* * * * *